4352X
2 Sheets-Sheet 1.
J. Delano,
Fire-Proof Safe.
Patented Mar. 7, 1826.
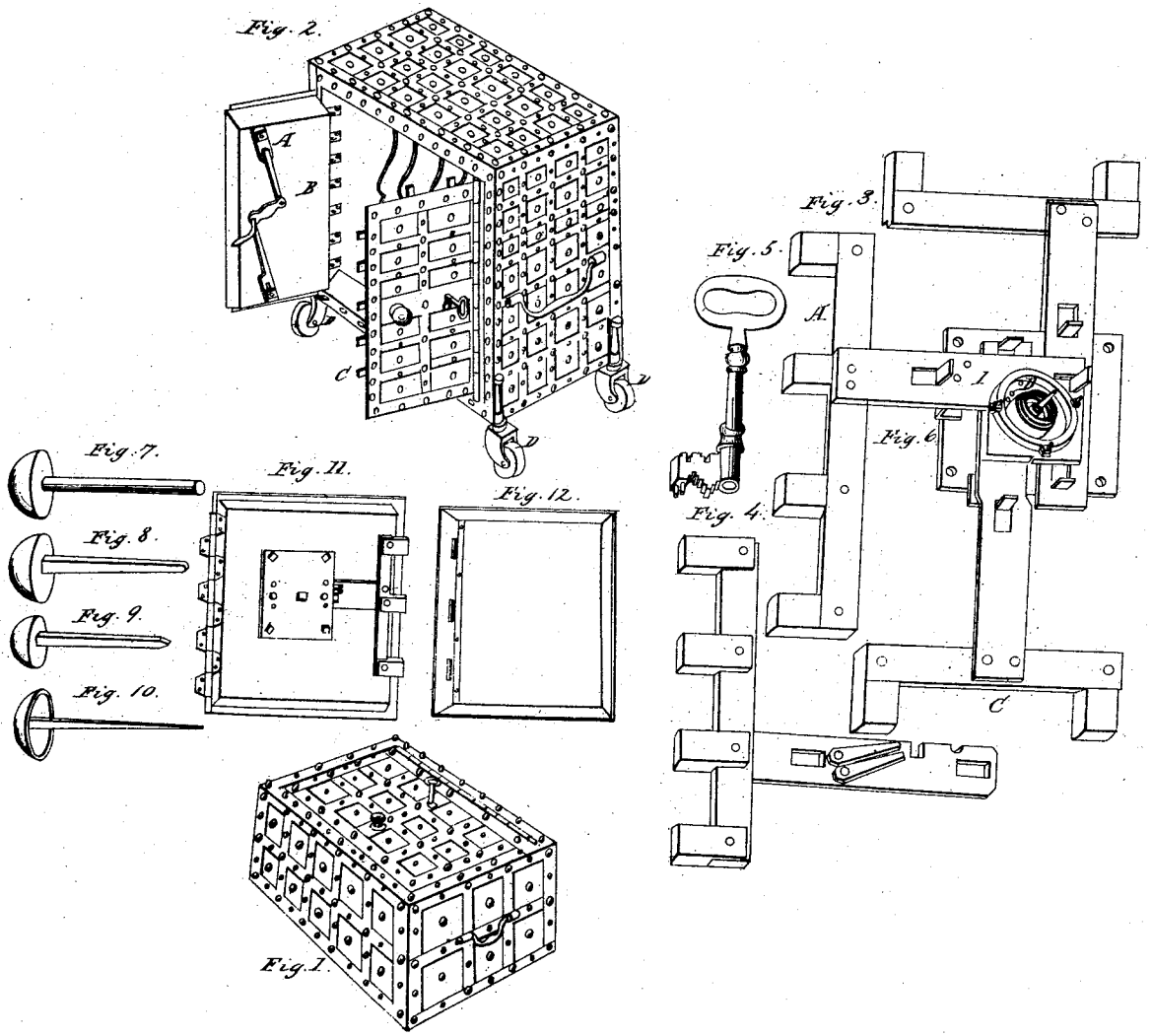

2 Sheets-Sheet 2.
4352X
J. Delano,
Fire-Proof Safe.
Patented Mar. 7, 1826.
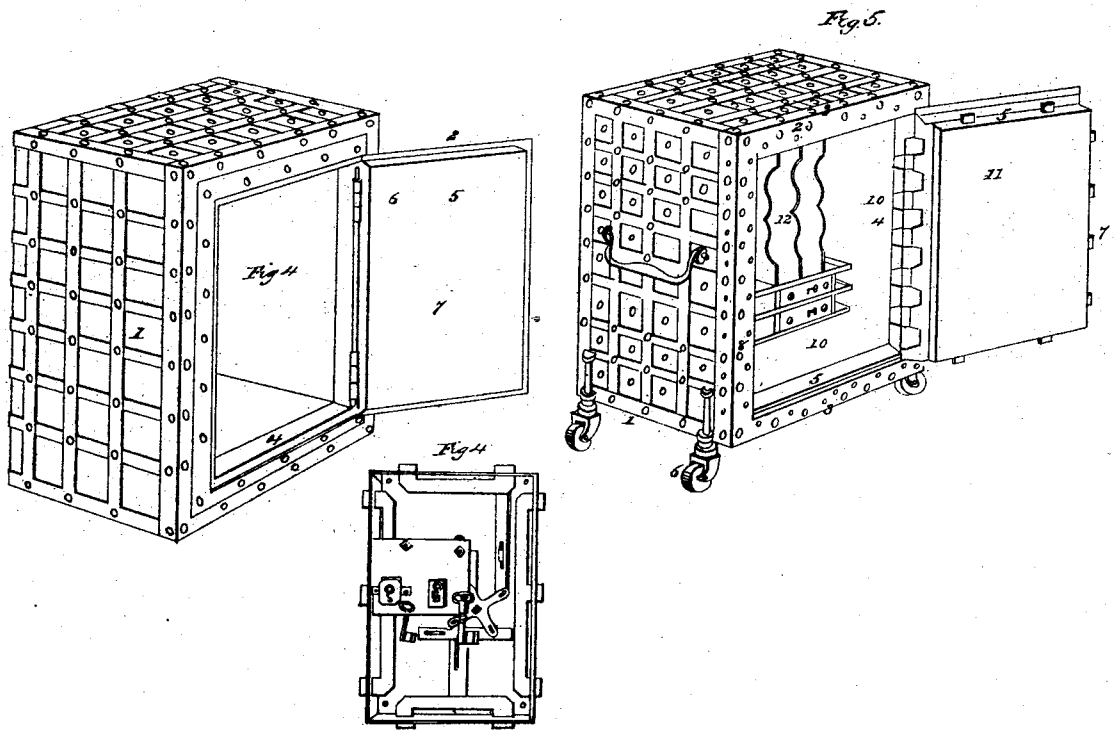

United States Patent Office

PTO - BOYERS, PA Duty Station

MISSING PAGE TEMPORARY NOTICE

PATENT # 4352X FOR ISSUE DATE 3-7-1826

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa